Nov. 12, 1963  P. STURMBERG  3,110,200
DEVICE FOR THE DRILLING OF STEEL PLANT INGOT MOLDS
Filed May 2, 1962  2 Sheets-Sheet 2

Inventor:

3,110,200
DEVICE FOR THE DRILLING OF STEEL PLANT INGOT MOLDS

Paul Sturmberg, Bochum, Germany, assignor to Bochumer Verein für Gusstahlfabrikation Aktiengesellschaft, Bochum, Germany, a German corporation
Filed May 2, 1962, Ser. No. 191,962
Claims priority, application Germany May 8, 1961
9 Claims. (Cl. 77—61)

This invention relates to apparatus for reboring permanent steel ingot and like moulds which after repeated use have a burnt uneven internal surface. The purpose of the proposed apparatus is to provide the mould with a fresh smooth internal surface by machining the same.

To this end the apparatus proposed by the invention comprises a toolholder which is radially movable in a boring spindle and reciprocable by a cam disc which is likewise mounted in the boring spindle and rotated at a speed exceeding that of the boring spindle by a multiple representing the number of corners possessed by the internal cross section of the mould.

The radial motion of the cutting tool may be derived from the rotary motion of the boring spindle, with due regard to the kinematics of the cam disc. A conventional boring mill can therefore be adapted for performing the work merely by the replacement of its boring spindle. The machine itself requires no modification. The motion of the cam disc can be conveniently derived from the rotation of the boring spindle through an intermediate epicyclic gearing mounted on the rear end of the boring spindle.

Owing to the presence of the radially movable toolholder and of the cam disc the diameter of the boring head containing these parts substantially exceeds that of the remainder of the boring spindle. Conveniently the head may be detachably affixable to the remainder of the boring spindle to permit ready access to the cam disc for its replacement. The means of attachment may be two cooperating flanges and an intermediate flange containing the cam disc may be interposed between them.

A gear train may be built into the boring spindle, driven either by the cam disc or its shaft, said gear train progressively radially lengthening or shortening the toolholder as the machine axially feeds, in such manner that the tool bit will machine a taper bore. The taper boring gear train may be driven by a driving pin fitted into the cam disc hub, said driving pin rotating a star wheel by one tooth in the course of each revolution performed by the cam disc. The taper boring gear train preferably comprises pick-off gears which are accessible when the member containing the cam disc has been dismantled. Moreover, the taper boring gear train should preferably be adapted for adjustment by hand whilst the driving pin is not in engagement therewith.

Figure 1:
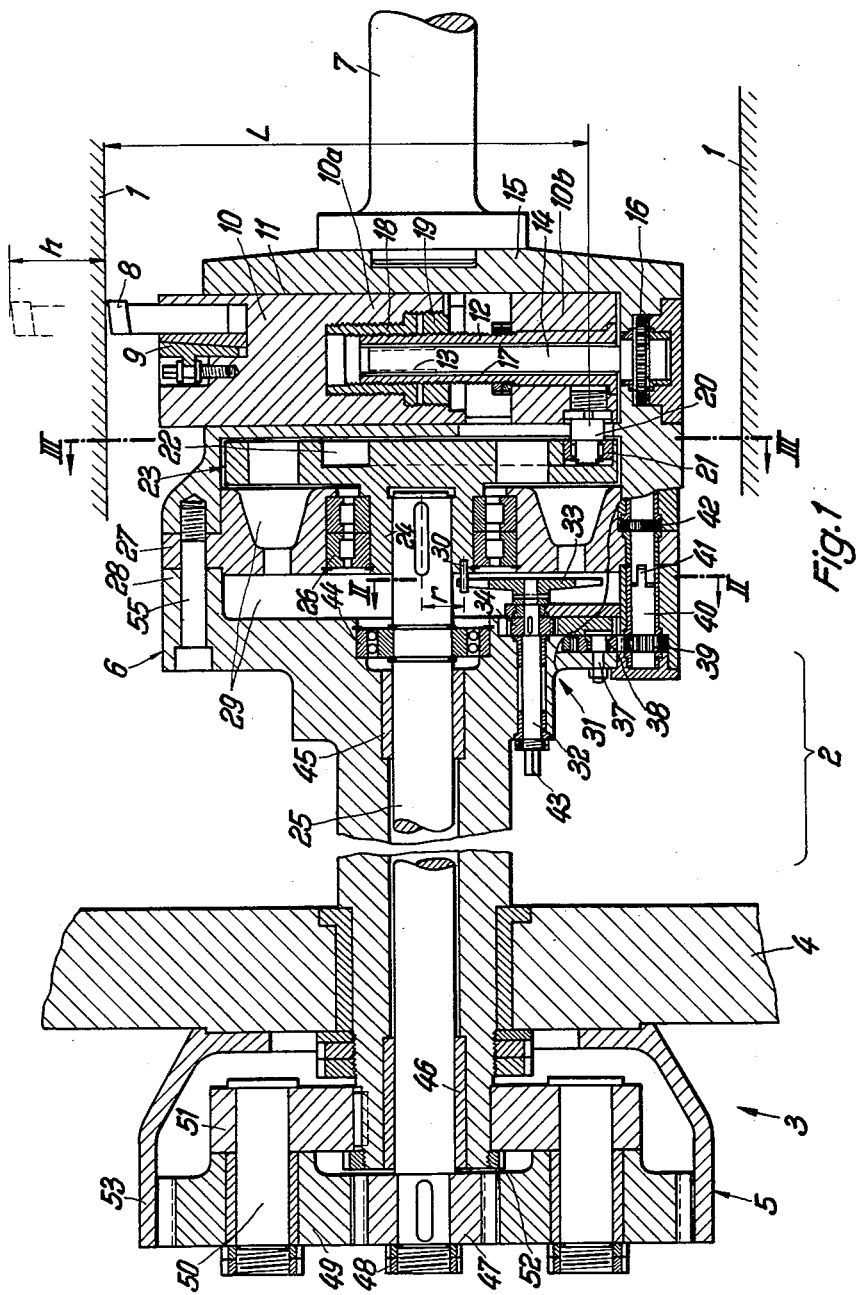
Figures 2, 3:
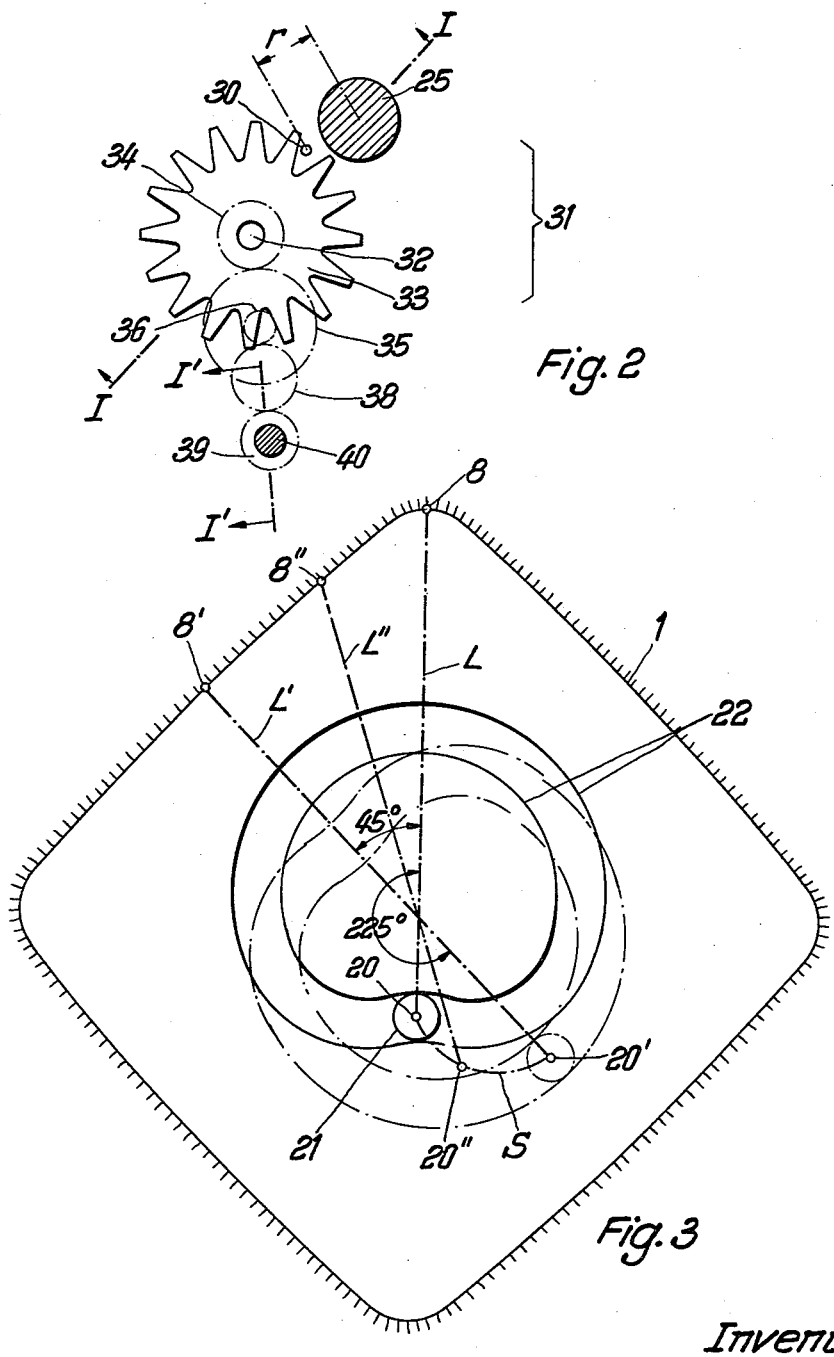

An embodiment of the invention is illustrated by the accompanying drawings in which FIG. 1 is a longitudinal section of a boring spindle according to the invention for reboring a permanent mould of substantially square internal section, FIG. 2 is the general layout of the taper boring gear train shown in a section taken on the line II—II in FIG. 1, and FIG. 3 is a cross section of the interior of the permanent mould with the cam disc inside the mould in a section taken on the line III—III in FIG. 1.

The drawings show the boring spindle 2 inside a permanent steel ingot mould of which a wall portion 1 is seen in FIG. 1. The complete cross section of the mould is shown in FIG. 3. The rear end 3 of the spindle is mounted and axially located in a part 4 of the main frame of a horizontal boring mill. This end of the spindle carries an epicyclic gearing 5 whereas the projecting forward end of the spindle mounts a tool head 6. Secured to the tool head 6 by means of a flange is an extension shaft 7 which is supported in bearings not shown in the drawings. It will therefore be understood that the spindle is supported at each end and that it passes from end to end through the mould. The means for driving the spindle in the machine are of conventional kind and therefore likewise not specially shown.

A tool bit 8 is clamped into a toolholder 10 by means of a wedge 9. The toolholder is a cylindrical member, a key not shown in the drawing being provided to prevent the holder from rotating about its longitudinal axis. In the drawing the toolholder is in fully contracted position. It is adapted slidably to reciprocate in a guideway 11, its stroke being indicated by $h$. Lengthwise the toolholder is divided into two longitudinal portions 10a and 10b, both mounted on a screw spindle 12 which permits the relative spacing of the two parts of the toolholder to be adjusted within a range $s$ either for the purpose of setting the bit 8 to the desired working diameter or to feed the bit radially when boring a divergent or convergent internal taper.

The screw spindle 12 is hollow and is held on a pin 14 by two splines 13. The pin is rotatable in casing 15 but is incapable of axial displacement. The end of the pin carries a wormwheel 16. The inside surface of the hollow screw spindle is provided with a pair of slots 17 for cooperation with the two splines. The screw spindle is mounted in part 10b of the toolholder in which it is likewise rotatable but incapable of axial movement. The free end of the screw spindle works in a nut 18. A counternut 19 takes up any axial play between the screw spindle 12 and its nut 18.

Screwed into the bottom end of part 10b is a pin 20 of which the projecting end carries a needle bearing 21. The latter runs in a cam slot 22 milled into a cam disc 23. The cam disc 23 has a hub 24 which is keyed to a shaft 25 and which revolves in twin roller bearings 26 in an intermediate flange 27. This intermediate flange is located between the flanged forward end 28 of the boring spindle 2 and the flange of casing 15. Relatively large cavities 29 remain inside tool head 6. These provide air cushions for absorbing the air displaced by the motion of the toolholder 10 which reciprocates like a piston of stroke $h$.

Offset radially by an amount $r$ from its axis the axial face of hub 24 carries a driving pin 30 for rotating a taper cutting gear train 31, illustrated schematically in greater detail in FIG. 2. Fast on the shaft 32 of a star wheel 33 is a pinion 34 which meshes with an intermediate wheel 35 on a layshaft which cannot be seen in the particular section shown in FIG. 1. This layshaft carries a further pinion 36 meshing with a transmission wheel 38 for engaging a driving wheel 39 on a shaft 40 which carries a worm. In FIG. 1 the principal axial section is interrupted and replaced by a section in a different axial plane to reveal relevant parts of gear train 31. The angle between the two sections is indicated in FIG. 2 by the positions of the two lines I—I and I'—I' which indicate the two sections. The worm mounted on that end of shaft 40, which is not seen in the drawing, drives wormwheel 16. At the division of the tool head 6 shaft 40 is likewise divided, the two half shafts engaging by slot and tongue 41. The thrust of the worm is taken up by a shoulder 42. Shaft 32 projects from the tool head and can be rotated by hand by the application of a tool to its square headed end 43.

Shaft 25 runs in bearings 44, 45 and 46. Secured by a key to its outer end is a pinion 47 retained by screw rings 48. This pinion 47 is the sunwheel of an epicyclic gearing 5. A pair of planet wheels 49 is rotatably mounted on short shafts 50 affixed to an arm 51. Arm 51 is pushed on to the rear, keyed end of the boring spindle 2 and retained by a screw ring 52. The outer gear ring 53 of the epicyclic assembly is secured to part 4 of the main machine frame and is therefore stationary. Wheels 47 and 49 are pick-off gears. In the illustrated embodiment their gear ratio is $i = n_{51}/n_{47} = 5$ for, according to FIG. 3, it is proposed to rebore a square section mould. The ratio of the relative speeds of rotation of shaft 25 and boring spindle 2 is as 4:1 because for say each 10 revolutions per minute of the boring spindle shaft 25 will perform an extra $50 - 10 = 40$ r.p.m.

The manner in which this embodiment functions is based on the conditions assumed in FIG. 3. FIG. 3 shows the square inside section of the permanent mould 1 with slightly curved sides and short radii at the corners. Let point 8 be the cutting point of the tool and point 20 the centre of the toolholder driving pin. Circle 21 is the outside diameter of the needle bearing and the twin curves 22 represent the slot cam guiding the needle bearing. The dot-dash line L connecting points 8 and 20 is the distance L indicated in FIG. 1. However, the position illustrated in FIG. 3 differs from that in FIG. 1 in that the tool bit in FIG. 3 is shown in its fully extended position (stroke $h$).

When the boring spindle turns through an angle of 45°, as indicated in the drawing, the cam slot 22 rotates five times as fast as the spindle because of the transmission ratio of the epicyclic gear assembly 5. The 45° rotation therefore takes the tool bit from point 8 to point 8', whereas the cam slot 22 turns through a total angle of $45 + (4 \times 45) = 225°$ and therefore reaches the position indicated by dotted outlines. The angular gain of the cam slot in relation to the tool bit is therefore $4 \times 45 = 180°$.

The shape of the cam slot is such that in the course of its rotation through 225° point 20 will be carried along the dot-dash line S from 20 to 20'. The distance L remains constant during this rotation, so that $L' = L$. In fact, for any point 8" distance L" remains permanently equal to L.

During the rebore the permanent mould is clamped in the boring mill and the boring spindle is passed through the mould as shown in FIG. 1, the projecting shaft end 7 being mounted in bearings. When the tool bit has been set up—partly with the aid of key 9 and partly by rotating the square end 43—the boring spindle is started. With reference to the adjustment of the square end it may be noted that this can be done only when the driving pin 30 is stationary at a point of its path not in engagement with star wheel 33. FIG. 2 clearly shows that driving pin 30 engages star wheel 33 only during a fraction of its complete circle of rotation. When the boring spindle rotates the speed of spindle 25 will be four times faster because of the transmission ratio of the epicyclic gearing. Hence the tool bit 8 will travel around the mould contour 1 and cut a chip determined by the axial feed of the boring spindle or of the mould by the boring mill.

In the course of each revolution of cam disc 23 the driving pin 30 will rotate the star wheel 33 by the pitch of one tooth. Gearing 31 transmits this stepwise motion—considerably reduced in speed—to worm wheel 16, thus causing the screw spindle 12 gradually to be screwed into or out of nut 18 inwards or outwards as the case may be. This action gradually reduces the length of distance $l$ in accordance with the internal taper of the mould. The tool bit will therefore generate a square section internal taper.

For readjusting the boring spindle to the boring of a hexagonal mould the forward end of the tool head 6, i.e. casing 15 is removed, screws 55 being undone. The intermediate flange 27 together with the cam disc 23 can then be taken down easily and replaced by a different intermediate flange with a cam disc suitable for boring a hexagonal outline. Casing 15 and the toolholder can then be reassembled, provided the diameter of the rebore is not substantially different from that which had been previously machined. Finally the pick-off gears 47/51 which have a transmission ratio of $i = 5$ are replaced by a pair of pick-off gears having a transmission ratio $i = 7$.

What I claim is:

1. Apparatus for boring permanent steel ingot moulds, comprising a toolholder which is radially movable in a boring spindle and reciprocable by a cam disc which is likewise mounted in the boring spindle and rotated at a speed exceeding that of the boring spindle by a multiple representing the number of corners possessed by the internal cross section of the permanent mould.

2. Apparatus as claimed in claim 1 in which the cam disc is mounted on a shaft which is coaxial with the boring spindle and which is driven by the boring spindle through intermediate gearing.

3. Apparatus as claimed in claim 2, in which the intermediate gearing is an epicyclic gearing, the planet wheel arm of said gearing being fast on the rear end of the boring spindle.

4. Apparatus as claimed in claim 1, in which the toolholder and the cam disc are contained in a tool head which is detachably affixed to the boring spindle to permit easy access to and replacement of the cam disc.

5. Apparatus as claimed in claim 4, in which the tool head is affixed to the boring spindle by means of a flange and the part supporting the cam disc is an interposed flange which is exchangeable together with the cam disc which it contains.

6. Apparatus as claimed in claim 1 including a gear train driven by the cam disc or its shaft and which is arranged to rotate a screw spindle for radially lengthening or shortening the toolholder in dependence upon the axial feed.

7. Apparatus as claimed in claim 6, comprising a cam disc having a hub which carries a driving pin for stepping a star wheel in the course of each revolution of the cam disc, said star wheel being the input member of the gear train for progressively radially lengthening or shortening the toolholder.

8. Apparatus as claimed in claim 6, in which the taper cutting gear train comprises a pair of pick-off gears which are accessible when the member containing the cam disc has been taken down.

9. Apparatus as claimed in claim 6 including a taper cutting gear train which can be hand operated from the outside of the tool head when the star wheel driving pin is not in engagement with the star wheel.

References Cited in the file of this patent

UNITED STATES PATENTS 1,091,914     Curtis _____ Mar. 31, 1914

FOREIGN PATENTS 48,833     Sweden _____ July 3, 1919